(12) United States Patent
Manevich et al.

(10) Patent No.: US 12,101,239 B2
(45) Date of Patent: Sep. 24, 2024

(54) EXECUTION OFFSET RATE LIMITER

(71) Applicant: Mellanox Technologies, Ltd., Yokneam Illit (IL)

(72) Inventors: Natan Manevich, Nesher (IL); Dotan David Levi, Kiryat Motzkin (IL); Roee Moyal, Yoqneam Illit (IL)

(73) Assignee: Mellanox Technologies, Ltd., Yokneam Illit (IL)

( * ) Notice: Subject to any disclaimer, the term of this patent is extended or adjusted under 35 U.S.C. 154(b) by 0 days.

(21) Appl. No.: 18/106,953

(22) Filed: Feb. 7, 2023

(65) Prior Publication Data

US 2023/0362096 A1 Nov. 9, 2023

Related U.S. Application Data

(60) Provisional application No. 63/339,538, filed on May 9, 2022.

(51) Int. Cl.
*H04L 12/00* (2006.01)
*H04J 3/06* (2006.01)
*H04L 43/0888* (2022.01)
*H04L 47/22* (2022.01)
*H04L 47/25* (2022.01)
*H04L 47/263* (2022.01)

(52) U.S. Cl.
CPC ........ *H04L 43/0888* (2013.01); *H04J 3/0652* (2013.01); *H04J 3/0667* (2013.01); *H04L 47/225* (2013.01); *H04L 47/25* (2013.01); *H04L 47/263* (2013.01)

(58) Field of Classification Search
CPC . G06F 9/5083; G06F 9/4806; H04L 67/1014; H04L 47/225; H04L 47/263
USPC .................................................. 709/219, 224
See application file for complete search history.

(56) References Cited

U.S. PATENT DOCUMENTS

| | | | |
|---|---|---|---|
| 10,382,535 B2 | 8/2019 | Sampathkumar et al. | |
| 10,691,653 B1 | 6/2020 | Aiken et al. | |
| 11,194,815 B1 | 12/2021 | Kumar et al. | |
| 2012/0079500 A1 | 3/2012 | Floyd et al. | |
| 2013/0346614 A1* | 12/2013 | Baughman ............ | G06F 9/5083 709/226 |
| 2015/0365309 A1 | 12/2015 | Kaminski et al. | |
| 2016/0057074 A1 | 2/2016 | Jacobs et al. | |
| 2017/0147410 A1* | 5/2017 | Burdick ................ | G06F 9/4806 |
| 2018/0004638 A1 | 1/2018 | Brown et al. | |
| 2018/0024861 A1 | 1/2018 | Balle et al. | |
| 2019/0042493 A1 | 2/2019 | Angoth et al. | |

(Continued)

*Primary Examiner* — Frantz Coby
(74) *Attorney, Agent, or Firm* — Lowenstein Sandler LLP

(57) ABSTRACT

A system includes a device coupled to a processing device. The processing device is to receive a request to execute a plurality of workloads, the request comprising a rate to execute each workload of the plurality of workloads and a parameter value indicating an execution offset. The processing device is further to determine a sequence for executing the plurality of workloads based on receiving the rate and the parameter value, where the sequence is to execute each workload at the respective rate and each workload of the plurality of workloads is executed at a different time based on the parameter value. The processing device is to execute the plurality of workloads in accordance with the sequence upon determining the sequence to execute the plurality of workloads.

20 Claims, 8 Drawing Sheets

(56) References Cited

U.S. PATENT DOCUMENTS

| | | |
|---|---|---|
| 2020/0014609 A1 | 1/2020 | Hockett et al. |
| 2022/0229706 A1 | 7/2022 | Nandagopal et al. |
| 2023/0108209 A1* | 4/2023 | Pilkington .......... H04L 67/1014 709/217 |

* cited by examiner

EXECUTION OFFSET RATE LIMITER

RELATED APPLICATIONS

This application claims the benefit of U.S. Provisional Application No. 63/339,538, filed May 9, 2022.

TECHNICAL FIELD

At least one embodiment pertains to processing resources used to perform and facilitate rate limiting and pacing. For example, at least one embodiment pertains to technology for an execution offset rate limiter. For example, at least one embodiment relates to a rate limiter scheduling or executing workloads offset from one another.

BACKGROUND

A device can receive and execute workload requests—e.g., transmit packets, perform an operation on data, etc. Some devices can include a rate limiter or rate pacing mechanism to control a rate of requests received or workloads executed—e.g., the device can include a rate limiter or rate pacing mechanism to ensure a number of workload requests does not exceed a threshold limit of the device. This can ensure the device is able to handle the workload requests in an efficient manner. Rate limiting, traffic shaping, rate pacing can be critical in computer network applications such as data center communication, media streaming, and congestion control algorithms—e.g., rate limiting can be used to avoid burst traffic and reduce congestion. For example, the device can be a network device that transmits packets—e.g., the device can transmit packets associated with video streaming to user devices. To ensure the packets are transmitted reliably and without congestion, the device can use a rate limiter to execute workloads at a desired rate. For example, the device can include a rate limiter to have a constant bit rate transmitted and to ensure bandwidth is satisfied. Conventional devices can rate limit a single workload—e.g., a single flow or stream of data transmitted as a plurality of packets. However, conventional devices may struggle to transmit multiple flows or streams (e.g., each associated with a respective plurality of packets) at a desired rate. Instead, multiple streams or flows could each simultaneously transmit a single packet at a same time and cause a burst of traffic and the overall traffic transmitted by the device may fail to be paced.

BRIEF DESCRIPTION OF DRAWINGS

Various embodiments in accordance with the present disclosure will be described with reference to the drawings, in which.

DETAILED DESCRIPTION

Figure 1A:
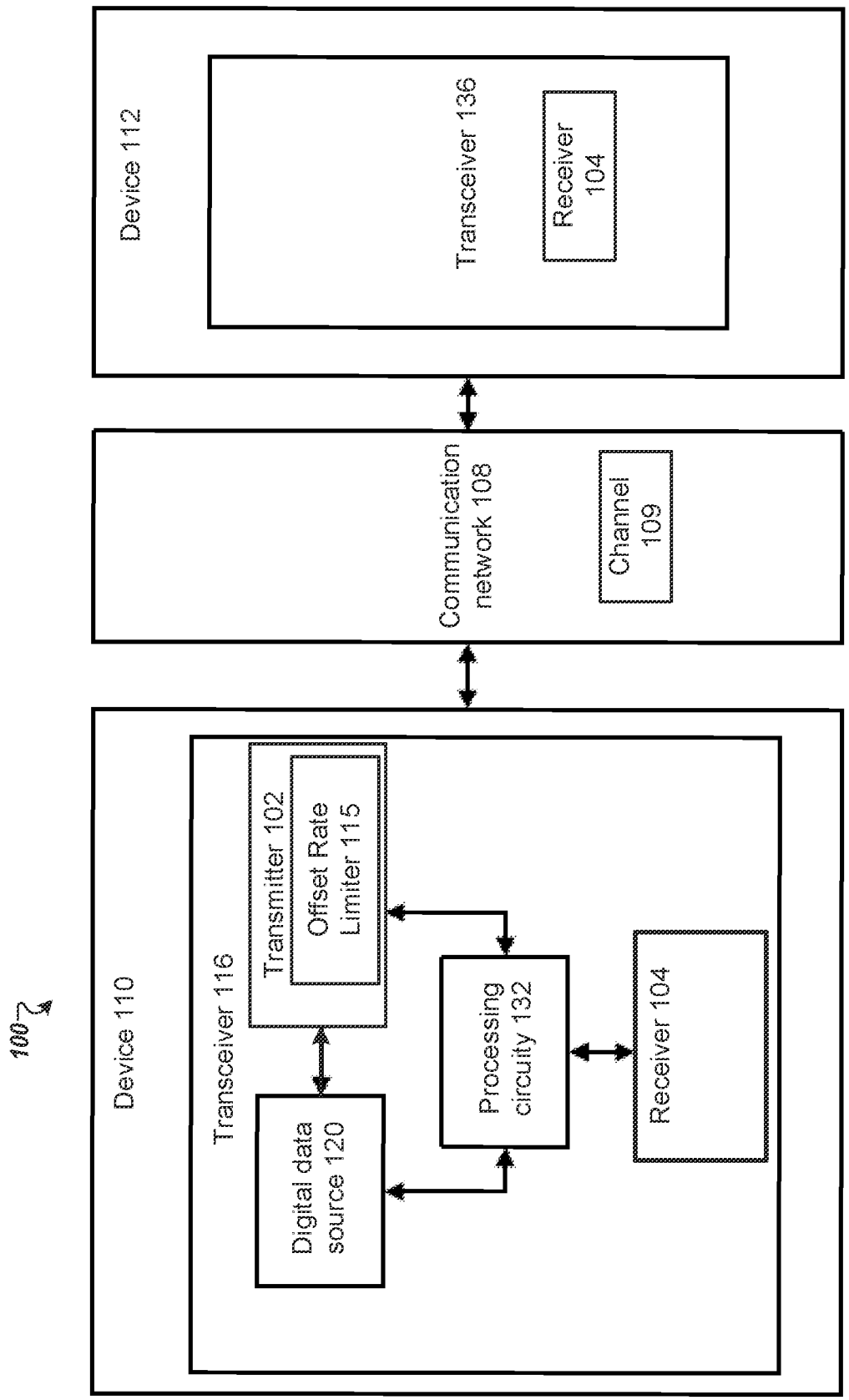
FIGS. 1A and 1B are examples of communication systems, in accordance with at least some embodiments.

As described above, devices can include a rate limiter to limit workloads received or executed at a respective time. The device can be used in data center communications, media streaming, or to enforce congestion control algorithms. For example, the device can be a network device (e.g., network interface card (NIC), network adapter, network switch, data processing unit (DPU), etc.). The network device can transmit a plurality of packets associated with a set of data (e.g., a flow or a stream) at a desired rate—e.g., at a desired bitrate. For example, the network device can enforce an interpacket gap on a link transmitting the packets—e.g., refrain from transmitting more than a threshold number of packets during a selected time period. Some devices can utilize this pacing mechanism to transmit several gigabits per second.

Some devices execute multiple workloads in parallel. For example, a device can transmit multiple sets of data (e.g., multiple flows or streams of data) at a same time. The device could be a network device that couples a cloud provider or data center to thousands of user devices and transmits sets of data to multiple devices at the same time. Conventional devices enforcing a desired bitrate for single streams can fail to pace or limit the rate of the overall traffic across the multiple flows being transmitted. For example, the network device may be able to transmit a single set of data at a selected rate but fail to transmit the multiple sets of data in uniform manner—e.g., due to hardware limitations the network device can pace a single set of data but not be able to pace multiple sets of data in parallel. A single packet being transmitted by each of the flows at the same time can cause a big burst of traffic across a link between the network device and the user devices. Accordingly, the traffic across the link can be uneven (e.g., fail to be paced traffic) and cause bandwidth issues.

Advantageously, aspects of the present disclosure can address the deficiencies above and other challenges by implementing a rate limiter that can enforce timing offsets between executing multiple workloads in parallel. For example, the rate limiter can receive an offset value (e.g., a transmission offset value or an execution offset value) that enables executing each workload at offset times while ensuring each workload is executed at a selected rate—e.g., transmit a packet for a first flow every second and a packet for a second flow every half second after the first flow, such that both flows are at a packet per second rate but transmitted with an offset between each other to avoid traffic congestion. In at least one embodiment, the rate limiter can receive the offset value from an operating system (e.g., a software component). For example, the rate limiter can receive a request to execute a plurality of workloads and an offset value indicating how to offset the execution of each workload. The execution or transmission offset value can indicate a number of offsets, an offset index, inter packet gap (e.g., a time between transmitting packets), an inter burst gap (e.g., a time between transmitting a burst), an internal time offset (e.g., time offset between flows), or a time anchor (e.g., a time at which to transmit a packet or burst). In some embodiments, the rate limiter can then determine a sequence in which to execute the workloads based on the execution offset value as described with reference to FIG. 2.

In some embodiments, the rate limiter can determine the offset value. For example, the rate limiter can receive a request to execute a plurality of workloads and a respective rate at which to execute each workload. The rate limiter can then determine an offset value that enables each workload to be executed at the respective rate while pacing the overall traffic as, for example, described with reference to FIG. 2 and FIG. 6. That is, the rate limiter can determine a sequence for executing the plurality of workloads in response to receiving the plurality of workload request and determining the offset value. For example, the rate limiter could receive a request to transmit a packet of a first set of data once every second and transmit a packet of a second set of data once every second. Rather than transmit both packets at a same time, the rate limiter can determine a sequence and transmit the packet of the first set at a time 0 and then transmit a packet of the second set at a time 0.5 (e.g., half a second after transmitting the packet of the first set). This can enable the rate limiter to transmit both packets at the selected rate and also pace the overall traffic.

In some embodiments, a system or multiple systems may each utilize a rate limiter to limit a rate of the overall traffic. For example, a system can include one or more first devices that transmit data, a network device, and a second device that receives data—e.g., the network device can receive data from each of the first devices and then transmit the received data to the second device. To enable the network device to transmit data to the receiving device in a paced or rated fashion, each first device can utilize a rate limiter such that the network device receives the data in an offset manner—e.g., the network device can receive data from the first devices at different offset times. Additional details regarding examples of utilizing the rate limiter transmission offset in multiple systems are described with reference to FIG. 4.

By utilizing a rate limiter that can enforce offsets between multiple flows, the system can pace the overall traffic communicated by a device—e.g., the system can pace traffic from a network adapter to several user devices. Additionally, the system can pace the overall traffic communicated by multiple devices at the same—e.g., can limit traffic from several devices that transmit data to a network adapter such that the network adapter can receive the data in a continuous fashion without a large burst of data. Accordingly, the offset rate limiter can mitigate data traffic congestion or bandwidth issues associated with executing multiple flows in parallel.

FIG. 1A illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as processing devices including a central processing unit (CPU), graphics processing unit (GPU) and/or data processing unit (DPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc.

As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals). In some embodiments, the communication network 108 can include one or more paths associated with transmitting data and one more paths associated with transmitting a clock signal.

The device 110 may include a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 may include suitable software and/or hardware for receiving digital data from the digital data source 120 and outputting data signals according to the digital data for transmission over the communication network 108 to a receiver 104 of device 112. In at least one embodiment, the transmitter 102 can include an offset rate limiter 115 (e.g., a rate limiter 115 that can enforce offsets between executing a plurality of workloads). In at least one embodiment, the offset rate limiter 115 can be a hardware device that paces workload execution. In at least one embodiment, the offset rate limiter 115 can be configured to receive a plurality of requests to execute respective workloads at a respective rate—e.g., each request of the plurality of requests can request to execute a plurality of workloads at a respective rate. In some embodiments, the rate limiter 115 can also receive an offset value (e.g., offset value 165 as described with reference to FIG. 1B) from a software component. In such embodiments, the offset rate limiter 115 can determine a sequence to execute each request at the respective rate offset from the other requests. For example, the offset rate limiter 115 can determine to execute a first request at a first time and then execute a second request at a second time that is offset from the first time such that the first request and second request are executed at the respective rate but at different times to avoid big bursts or network traffic congestion. Additional details regarding examples of the offset rate limiter 115 determining a sequence to execute the request at the respective rate offset from each other are described with reference to FIG. 2 and FIG. 3. In some embodiments, the offset rate limiter 115 is configured to determine an offset value. For example, the offset rate limiter 115 can receive a request to execute a plurality of workloads, where the request includes a respective rate at which to execute the plurality of workloads. The offset rate limiter 115 can determine an offset value that enables the rate limiter 115 to execute the plurality of workloads offset from one another while still executing each workload at the respective rate. Additional details regarding examples of the offset rate limiter 115 determining the offset value 165 are described with reference to FIG. 6.

In at least one embodiment, each device of a system 100 can include an offset rate limiter 115. This can enable the system 100 to enforce the offset rate limiting across multiple devices in parallel. For example, there may be multiple devices 110 coupled with device 112, each device 110 including an offset rate limiter 115. In some embodiments, the system 100 may transmit data at a respective rate from the plurality of devices 110 to device 112—e.g., the system 100 can retrieve data from each device 110 and transmit the retrieved data at a respective rate to device 112. To avoid each device 110 concurrently transmitting data (e.g., to avoid a big burst or network congestion), the system 110 can enforce an offset between each device 110. For example, a first device 110 can transmit a packet at a first time and a second device 110 can transmit a packet at a second time, where each packet is transmitted in accordance with the respective rate. Accordingly, the system 100 can enforce the respective rate while executing the workloads at each device 110 in an offset fashion. Additional details regarding examples of utilizing the offset rate limiter across two or more devices of a system are described with reference to FIG. 4.

The receiver 104 of device 110 and 112 may include suitable hardware and/or software for receiving signals, such as data signals from the communication network 108. For example, the receiver 104 may include components for receiving processing signals to extract the data for storing in a memory, as described in detail below with respect to FIG. 2-FIG. 6.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 1B:
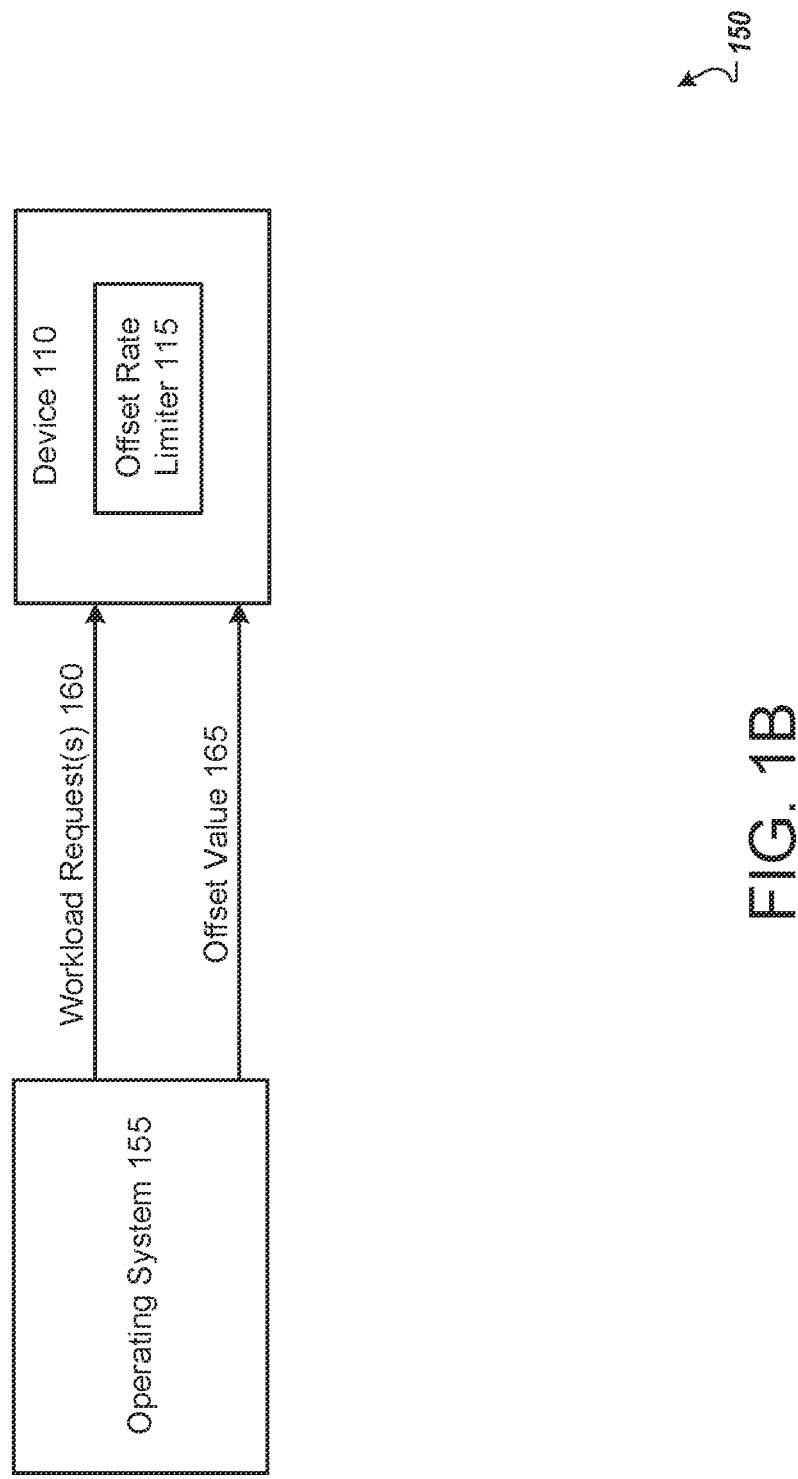

FIG. 1B illustrates an example communication system 150 according to at least one example embodiment. The system 150 can include a device 110 and an operating system 155. In some embodiments, the device 110 can include an offset rate limiter 115. In some embodiments, the operating system 155 can be included in the device 110, and the offset rate limiter 115 can be included in transceiver 116 as described with reference to FIG. 1A. In some embodiments, the operating system 155 can be included in a host device or host system that includes the device 110 or is coupled to the device 110.

In at least one embodiment, the operating system 155 is configured to transmit workload request(s) 160 to device 110. In some embodiments, the operating system 155 can also transmit a respective rate value indicating a rate to execute each workload request(s) 160. In at least one embodiment, the operating system 155 can select a rate value based on an application specification or a client device request. In some embodiments, the rate value is transmitted within the workload request(s) 160. In at least one embodiment, the rate value includes two or more numbers—e.g., the rate value can be a fractional value including a numerator and a denominator. In at least one embodiment, the rate value can include an integer plus a numerator and a denominator.

In some embodiments, the operating system 155 is configured to transmit the rate value to device 110 to configure the rate value to certain resources or components of device 110. For example, the operating system 155 can transmit the rate value to associate the rate value to a work queue of device 110, a network flow of device 110, to a virtual machine (VM) of device 110, to a host device of a multi-host system within system 150, to a respective memory space range (e.g., to a respective memory address range), or to a link priority—e.g., the operating system 155 can configure the rate value to an Ethernet priority of device 110. In some embodiments, the operating system 155 can transmit multiple rate values in parallel—e.g., the operating system 155 can transmit multiple workload requests 160 in parallel and a respective rate value for each workload request 160. Accordingly, the device 110 can be configured to process multiple workloads each having a different rate value in parallel. In some embodiments, the operating system 155 can be within a host device or a host system.

In at least one embodiment, the operating system 165 is configured to transmit an offset value 165 to device 110. In at least one embodiment, the operating system 155 can select an offset value based on an application specification or a client device request—e.g., based on a client device request to pace traffic at a link at a specific rate. In some embodiments, the offset value 165 can indicate to the device 110 an offset time to enforce between executing a workload request(s) 160—e.g., the offset value 165 can enable the device 110 to determine a sequence for executing the workload request(s) 160 at the respective rate value offset from one another. In at least one embodiment, the offset value can indicate a number of offsets, an offset index, inter packet gap (e.g., a time between transmitting packets), an inter burst gap (e.g., a time between transmitting a burst), an internal time offset (e.g., time offset between flows), or a time anchor (e.g., a time at which to transmit a packet or burst).

For example, the offset value can indicate a rate, a number of offsets, and an offset index. In such embodiments, the device 110 can be configured to determine a sequence of executing the workloads by dividing an inter packet gap by a number of offsets and an actual offset between the workloads is the offset index. For example, the device 110 can receive an indication there are two offsets—an offset index for a first workload is a first value and an offset index for a second workload is a second value. The device 110 can divide an inter packet gap by two (2) (e.g., by the number of offsets) and execute the workloads at the offset index—e.g., at a difference between the second value and the first value.

In some embodiments, the offset value can indicate a inter packet or inter burst gap, a number of offsets, and an offset index. In such embodiments, the device 110 can determine a sequence for executing the workloads based on the inter packet or inter burst gap, a number of offsets, and an offset index. For example, the device 110 could receive an inter burst gap of one (1) second, 1000 offsets, and an offset index of 100. In such embodiments, the device 110 can determine each offset represents a thousandth (1/1000) of a second (e.g., a millisecond) and determine the offset index of 100 indicates the desired offset is 100 milliseconds within the second of the inter burst gap—e.g., execute a workload each 100 milliseconds to ensure each workload is executed within the desired rate of one second.

In at least one embodiment, the offset value can indicate an inter burst gap (e.g., a time between bursts of transmitting a set of data) and an internal time offset (e.g., a time between transmitting data of the set of data and data of a second set of data). In such embodiments, the device 110 can determine a sequence for executing the workloads by determining a difference between time offset values of the respective workloads. For example, the device 110 can receive an inter burst gap of one (1) second and a first offset value of 100 milliseconds associated with a first workload and a second offset value of 600 milliseconds. The device 110 can take a difference between the second offset value and the first offset value to determine an offset of 500 milliseconds between executing the first workload and the second workload. Accordingly, the device 110 can execute the first workload and second workload at the respective rate (e.g., transmit a burst every second) offset from one another.

In at least one embodiment, the offset value can indicate an inter burst gap and a time anchor (e.g., a real world time value). In such embodiments, the device 110 can determine an offset based on the time anchor—e.g., an indicated time at which to transmit or execute a workload or a portion of a workload. For example, the device 110 can receive an inter burst gap of one (1) second and a time anchor indicating a time 8:00:00 (e.g., 8 a.m. exactly). In such examples, the device can determine the offset is one (1) second—e.g., a packet is transmitted every round second (e.g., at 8:00:00, 8:00:01, 8:00:02, etc.).

It should be noted that in some embodiments the device 110 can be unaware of an actual inter packet gap or inter burst gap. For example, if the device receives a rate, a number of offsets, and an offset index, the device 110 can select different values for the inter burst gap or inter packet gap as long as the burst size is correct. In such examples, the device 110 can perform calculation using the selected gap—e.g., divide the inter burst gap by the number of offsets. That is, there can be many different possible sequences the device 110 can determine to execute the workloads offset from one another—e.g., the device 110 could achieve a rate of one (1) packet per second by transmitting a single packet every second or by transmitting two packets every two (2) seconds.

In at least one embodiment, device 110 is configured to receive workload requests 160 and one or more offset values 165 from the operating system 155. In some embodiments, the device 110 is configured to execute one or more workloads received—e.g., execute an application, service, capability, or collection of resources and code. For example, the device 110 can be configured to process data or perform an operation responsive to receiving the workload request(s) 160. In some embodiments, the device 110 can be an example of a network device e.g., a network interface card (NIC), network switch, network adapter, data processing unit (DPU), etc. In such embodiments, the device 110 can transmit and receive packets as part of executing a workload request—e.g., transmit packets to coupled user devices in response to receiving the workload request(s) 160.

In at least one embodiment, the offset rate limiter 115 is configured to determine the offset value 165. In such embodiments, the operating system 155 can transmit workload request(s) 160 and refrain from transmitting offset value 165. For example, device 110 can receive the workload requests 160 from the operating system 155. In some embodiments, the workload request 160 can indicate to execute a number of workloads at a respective rate. For example, the workload request can indicate to execute ten (10) or twenty (20) workloads in total, each at a rate of once per second. In such embodiments, the device 110 can determine an offset value and a sequence to execute the workloads based on a number of workloads and the rate. For example, the device 110 could execute ten (10) workloads a second by evenly distributing the execution over the second (e.g., execute each workload with an offset of 0.1 seconds such that a first workload is executed at a time 0, a second workload is executed at a time 0.1 seconds, a third workload is executed at a time 0.2 seconds, and so forth). In another example, the device 110 could execute twenty (20) workloads by executing each workload with an offset of 0.05 seconds—e.g., execute a first workload at a time zero(0), execute a second workload at a time 0.05 seconds, execute a third workload at a time 0.1, and so forth. In some embodiments, the offset rate limiter 115 can determine the offset value for a plurality of workloads each having a different respective rate—e.g., the device 110 can determine a sequence for executing the plurality of workloads even if each workload is executed at a different rate as described with reference to FIG. 3

Figure 2:
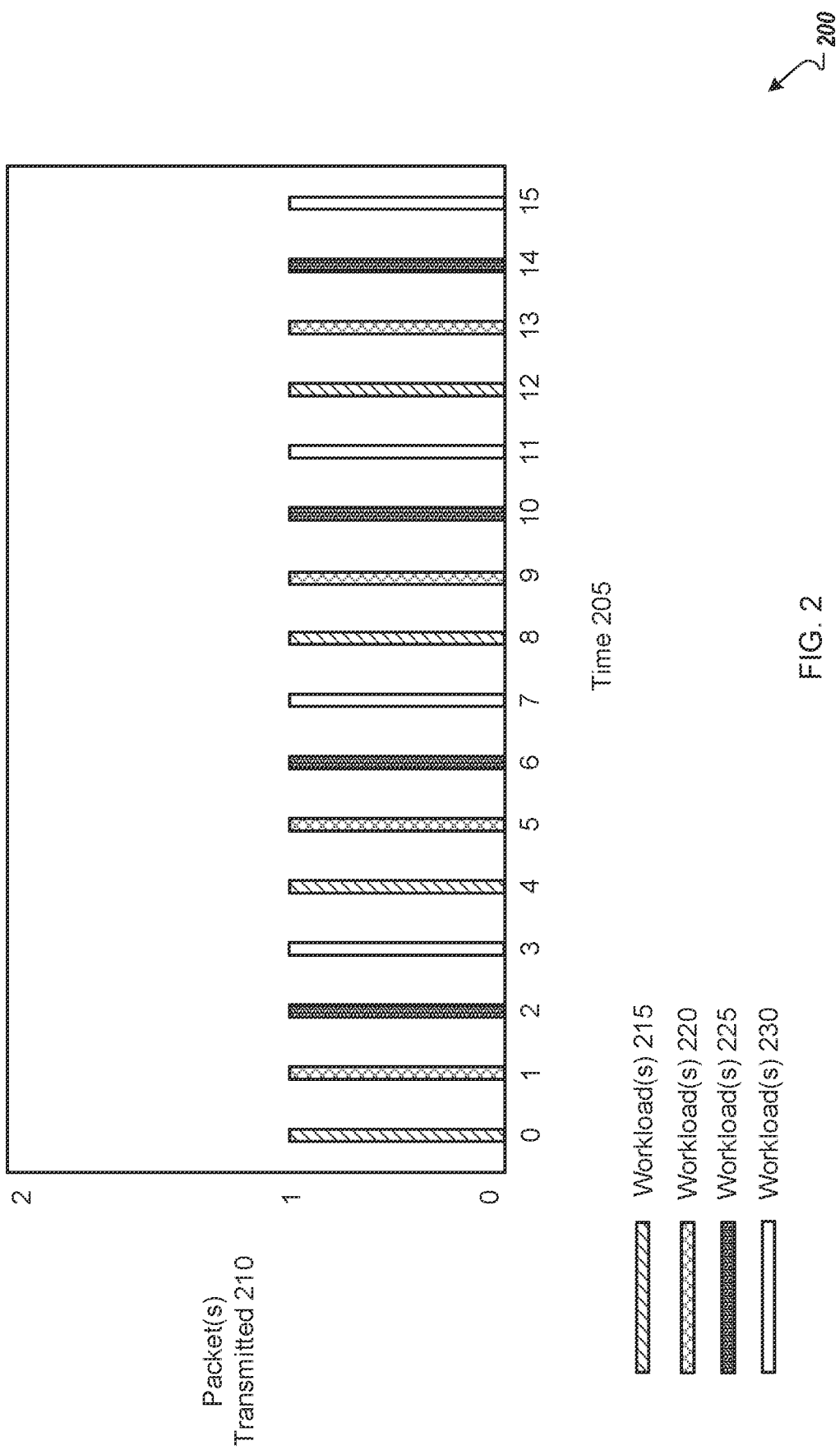
FIG. 2 is a diagram illustrating an execution offset rate limiter, in accordance with at least some embodiments.

FIG. 2 illustrates a diagram 200 for an offset rate limiter according to at least one example embodiment. In at least one embodiment, diagram 200 can illustrate a sequence for executing a plurality of workloads determined by a rate limiter—e.g., by offset rate limiter 115 as described with reference to FIGS. 1A and 1B. Diagram 200 can illustrate a number of packet(s) transmitted 210 during a respective time 205. In at least one embodiment, time 205 can represent seconds, milliseconds, nanoseconds, picoseconds, etc. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. That is, as described with reference to FIG. 1B, the device 110 or offset rate limiter could possibly determine any number of sequences for transmitting each workload at a respective rate offset from one another. Additionally, although diagram 200 illustrates a packet being transmitted at a respective time, the offset rate limiter 115 can transmit any number of packets at a respective time—e.g., transmit two, three, four, five, six, or more packets at a respective time. In some embodiments, the rate limiter 115 can transmit bursts—e.g., transmit any number of bursts at a respective time. In some embodiments, the rate limiter 115 can execute one or more workloads. In such embodiments, diagram 200 may include a Y-axis that indicates a number of workloads executed at a respective time 205.

In at least one embodiment, diagram 200 can illustrate an offset rate limiter (e.g., offset rate limiter 115 as described with reference to FIG. 1B) executing four (4) workload(s) in parallel—e.g., execute workload 215, workload 220, workload 225, and workload 230 in parallel. In at least one embodiment, the offset rate limiter 115 can execute more than or less than four (4) workloads in parallel—e.g., execute one, two, three, four, five, six . . . thousands or more workloads in parallel.

In at least one embodiment, the offset rate limiter can receive one or more requests associated with executing workload 215, workload 220, workload 225, and workload 230. In at least one embodiment, the offset limiter 115 can receive a respective rate to execute each workload—e.g., a respective rate to execute workload 215, workload 220, workload 225, and workload 230. In some embodiments, the rate limiter 115 can receive a same respective rate for each workload. For example, the offset rate limiter 115 can receive a request(s) to transmit one packet per second for workload 215, workload 220, workload 225, and workload 230.

In at least one embodiment, the rate limiter 115 can receive an offset value associated with executing the one or more workload requests. For example, the rate limiter 115 could receive an offset value that indicates there are four (4) offsets with an offset index of one (1) second. In other embodiments, the rate limiter 115 can determine the offset value. For example, the rate limiter 115 can determine an offset value for executing each workload as described with reference to FIG. 1B. For example, rate limiter 115 can receive four workload requests (e.g., four requests to execute workloads 215-230) and a rate of one packet every four (4) seconds. Accordingly, the rate limiter 115 can calculate an offset value from a number of requests and the respective rate—e.g., determine an offset of one (1) based on four (4) requests each transmitting a packet every four (4) seconds. In either embodiment (e.g., the rate limiter 115 receives the offset value or determines the offset value), the rate limiter 115 can determine a sequence for executing the workloads 215-230 as illustrated by diagram 200.

For example, the rate limiter 115 can determine a sequence for executing the workloads that transmits a packet for workload 215 at a time zero (0), transmits a packet for workload 220 at a time one (1), transmits a packet for workload 225 at a time two (2), and transmits a packet for workload 230 at a time three (3). In at least one embodiment, the rate limiter 115 can continue to transmit packets according to the sequence—e.g., transmit a second packet for workload 215 at a time four (4), transmit a second packet for workload 220 at a time five (5), transmit a second packet for workload 225 at a time six (6), transmit a second packet for workload 230 at a time seven (7), transmit a third packet for workload 215 at a time eight (8) and so forth until the execution of each workload is complete. As illustrated by diagram 200, the rate limiter 115 can determine a sequence that enables each workload to be executed at a respective rate and pace the overall traffic—e.g., transmit a packet each second rather than transmit all four packets for each workload at one time and wait four seconds to transit all four packets for each workload again. For example, diagram 200 illustrates the rate limiter 115 executing workload 215, workload 220, workload 225, and workload 230 at a respective rate (e.g., at a rate of one packet every four seconds) while maintaining a constant offset between workload executions e.g., enforcing an offset of one (1) second between workload execution. For example, the rate limiter 115 can transmit a packet for workload 215, wait a second, and then transmit a packet for workload 220.

As described above, there can be any number of possible sequences the rate limiter 115 can determine for a given set of received requests or workloads. In some embodiments, the rate limiter 115 can be configured to allocate groups of workloads to a single offset. For example, the rate limiter 115 can receive eight (8) workload requests distributed into four (4) offsets. In such examples, the rate limiter 115 can group two workloads for each offset—e.g., the rate limiter 115 could transmit a packet for workload 215 and an additional workload at a time zero (0), transmit a packet for workload 220 and an additional workload at a time (1), transmit a packet for workload 225 and an additional workload at a time two (2), transmit a packet for workload 230 and an additional workload at a time three (3), and so forth. That is, the rate limiter 115 does not necessarily have to ensure each workload is executed at a different time, rather the rate limiter 115 can be configured to execute the workloads according to a desired offset to pace the overall network traffic.

In at least one embodiment, the rate limiter 115 can automatically determine an offset value or sequence when a rate for each workload is the same. For example, the rate limiter 115 can automatically distribute the four workloads across the four seconds according to an inter burst or inter packet gap. In such examples, the rate limiter 115 can automatically calculate a new offset value or sequence if additional workloads are received—e.g., the rate limiter 115 can distribute five workloads across the four seconds at an offset of 0.8 seconds each if an additional workload is received.

Figure 3:
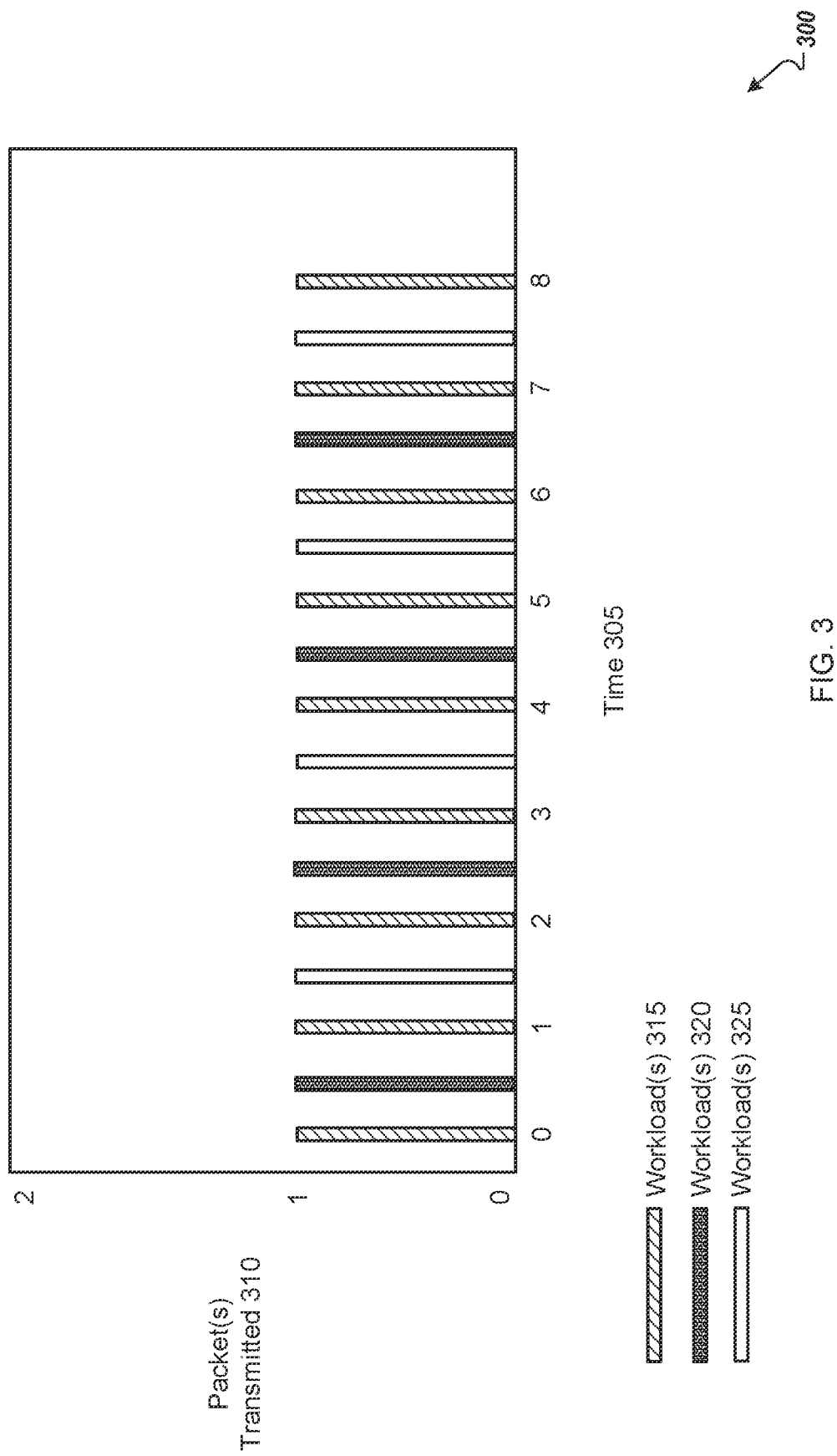
FIG. 3 is a diagram illustrating an execution offset rate limiter, in accordance with at least some embodiments.

FIG. 3 illustrates a diagram 300 for an offset rate limiter according to at least one example embodiment. In at least one embodiment, diagram 300 can illustrate a sequence for executing a plurality of workloads determined by a rate limiter—e.g., by offset rate limiter 115 as described with reference to FIGS. 1A and 1B. Diagram 300 can illustrate a number of packet(s) transmitted 310 during a respective time 305. In at least one embodiment, time 305 can represent seconds, milliseconds, nanoseconds, picoseconds, etc. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. That is, as described with reference to FIG. 1B, the device 110 or offset rate limiter could possibly determine any number of sequences for transmitting each workload at a respective rate offset from one another. Additionally, although diagram 300 illustrates a packet being transmitted at a respective time, the offset rate limiter 115 can transmit any number of packets at a respective time—e.g., transmit two, three, four, five, six, or more packets at a respective time. In some embodiments, the rate limiter 115 can transmit bursts—e.g., transmit any number of bursts at a respective time. In some embodiments, the rate limiter 115 can execute one or more workloads. In such embodiments, diagram 300 may include a Y-axis that indicates a number of workloads executed at a respective time 305.

In at least one embodiment, diagram 300 can illustrate an offset rate limiter (e.g., offset rate limiter 115 as described with reference to FIG. 1B) executing three (3) workload(s) in parallel—e.g., execute workload 315, workload 320, and workload 325 in parallel. In at least one embodiment, the offset rate limiter 115 can execute more than or less than three (3) workloads in parallel—e.g., execute one, two, three, four, five, six . . . thousands or more workloads in parallel.

In at least one embodiment, the offset rate limiter can receive one or more requests associated with executing workload 315, workload 320, and workload 325. In at least one embodiment, the offset limiter 115 can receive a respective rate to execute each workload—e.g., a respective rate to execute workload 315, workload 320, and workload 325. In some embodiments, the rate limiter 115 can receive a different respective rate for at least one of the workloads. For example, the offset rate limiter 115 can receive a request(s) to transmit one packet per second for workload 315 but receive a request(s) to transmit one packet every two seconds for workload 320 and workload 325.

In at least one embodiment, the rate limiter 115 can receive an offset value associated with executing the one or more workload requests. For example, the rate limiter 115 could receive an offset value that indicates there are three (3) offsets with an offset index of half a second (0.5 seconds). In other embodiments, the rate limiter 115 can determine the offset value. For example, the rate limiter 115 can determine an offset value for executing each workload as described with reference to FIG. 1B. For example, rate limiter 115 can receive three workload requests (e.g., three requests to execute workloads 315, 320, and 325) and a rate of one packet every one second for workload 315 and one packet every two seconds for workload 320 and workload 325. Accordingly, the rate limiter 115 can calculate an offset value from a number of requests and the respective rate—e.g., determine an offset of one half between executing workloads 315 and 320 and another offset of one half between executing workloads 315 and 325—e.g., the rate limiter 115 can determine to execute workload 315 twice in two seconds and workloads 320 and 325 once in two seconds according to their respective rates. In either embodiment (e.g., the rate limiter 115 receives the offset value or determines the offset value), the rate limiter 115 can determine a sequence for executing the workloads 315-325 as illustrated by diagram 300.

For example, the rate limiter 115 can determine a sequence to execute the workloads 315-325 such that a packet associated with workload 315 is transmitted at time zero (0), a packet associated with workload 320 is transmitted at a time one half (0.5), a second packet associated with workload 315 is transmitted at a time one (1), and a packet associated with workload 325 at a time one and a half (1.5), before repeating the sequence—e.g., transmitting a third packet associated with workload 315 at a time two (2), transmitting a second packet associated with workload 320 at a time two and a half (2.5), and so forth. Accordingly, the offset rate limiter can also offset workloads with different rates or inter burst gaps to enable the overall traffic to be paced and avoid network traffic congestion—e.g., the rate limiter 115 can overall transmit a packet every half second rather than potentially transmitting all three packets at an overlapping rate or time.

Figure 4:
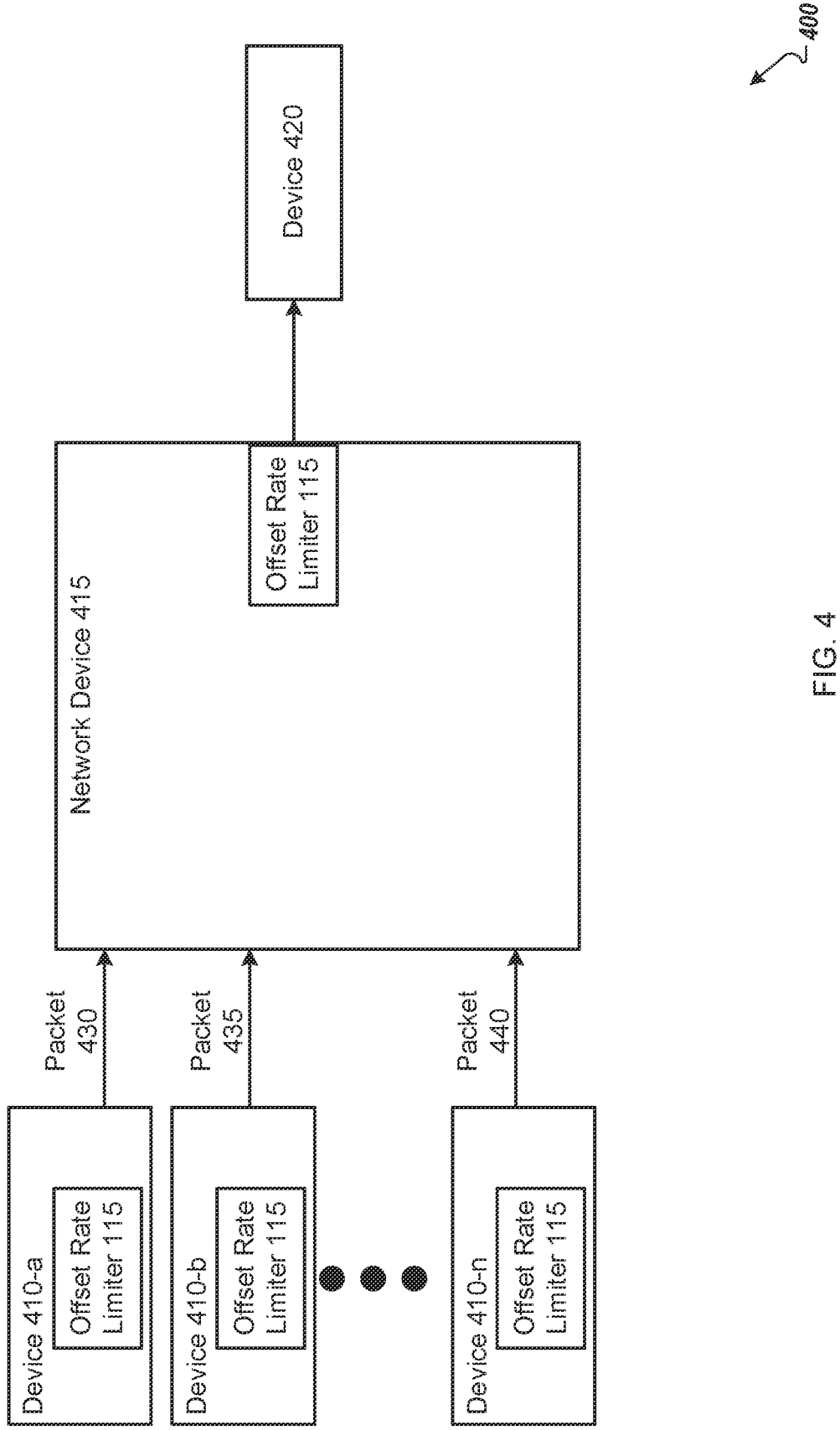
FIG. 4 illustrates an example communication system for execution offset rate limiting, in accordance with at least some embodiments.

FIG. 4 illustrates an example communication system 400 according to at least one example embodiment. In at least one embodiment, the system 400 can be an example of system 100 or 150 as described with reference to FIGS. 1A and 1B. The system 400 can include devices 410 (e.g., a set of first devices), a network device 415, and a device 420 (e.g., a second device). In some embodiments, devices 410, network device 415, and devices 420 can be examples of device 110 and device 112 as described with reference to FIGS. 1A and 1B. In some embodiments, network device 415 can be an example of a network interface card (NIC), network adapter, network switch, data processing unit (DPU), etc. In at least one embodiment, the devices 410 and network device 415 can include an offset rate limiter 115 as described with reference to FIG. 1. In some embodiments, portions of system 400 can be located in a data center. In at least one embodiment, system 400 can illustrate an example of utilizing an offset rate limiter to control traffic of multiple systems.

In at least one embodiment, devices 410-*a* can be configured to transmit data or packets to device 420 via the network device 415. For example, devices 410-*a* can transmit a packet 430 to device 420 via the network device 415. In some embodiments, the devices 410 can be located in a data center. For example, devices 410 may each store data or access data stored in a data center. In some embodiments, the devices 410 may transmit data to device 420 that corresponds to a video stream—e.g., the network device 415 can route data from multiple devices 410 to device 420, where the data corresponds to or represents a video streamed to device 420.

In at least one embodiment, the system 400 can utilize offset rate limiters 415 at each device 410 to control the network traffic transmitted to the network device 415 and to the device 420. In such embodiments, the system 400 can include a software component or operating system (e.g., operating system 155) that transmits workloads and respective rates and offset values to each device 410. In at least one embodiment, the software component can transmit an offset value such that the devices 410 transmit packets in an offset manner. For example, the software component can transmit a workload request to each device 410 indicating to transmit one packet a second. In such examples, the software component can transmit a different offset value to each device 410 to enable the traffic transmitted to the network device 415 and device 420 to be controlled and paced. In one example, the software component can transmit an offset value of zero (0) to device 410—an offset value of one third (⅓) to device 410-*b* and an offset value of two thirds (⅔) to device 410-*n*. In such examples, device 410-*a* can transmit packet 430 at a first time (e.g., time zero), device 410-*b* can transmit a packet 425 at a second time (e.g., time one third), device 410-*n* can transmit a packet 410-*n* at a third time (e.g., time two thirds), and so forth—e.g., the device 410-*a* could transmit a second packet at a time one (1), device 410-*b* could transmit a second packet at a time one and a third (1⅓), and so forth. Accordingly, network device 415 can receive packets from the devices 410 in an offset fashion (e.g., every third of a second).

In at least one embodiment, the network device 415 is configured to route data received from devices 410 to device 420. For example, network device 415 can route packet 430, packet 425, and packet 440 from device 410-*a*, 410-*b*, and 410-*n*, respectively, to device 420. In at least one embodiment, the network device 415 can be configured to transmit the data to device 420 in a controlled and offset manner when offset rate limiting is used for the system as a whole—e.g., the network device 415 can be configured to transmit data to device 420 in a uniform manner when the data received from devices 410 is uniform. In at least one embodiment, the network device 415 can utilize a offset rate limiter 115 to further ensure the data transmitted to device 420 is offset and uniform. For example, the network device 415 may receive some data from devices 410 in an uneven manner—e.g., there can be an error that causes the network device 415 to receive a burst of data from devices 410. To ensure the burst does not affect device 420, the network device 415 can utilize the offset rate limiter 115 to offset data transmission to device 420—e.g., the system 400 can limit and offset the rate at the devices 410 and 415 to ensure the overall traffic is controlled and paced.

Figure 5:
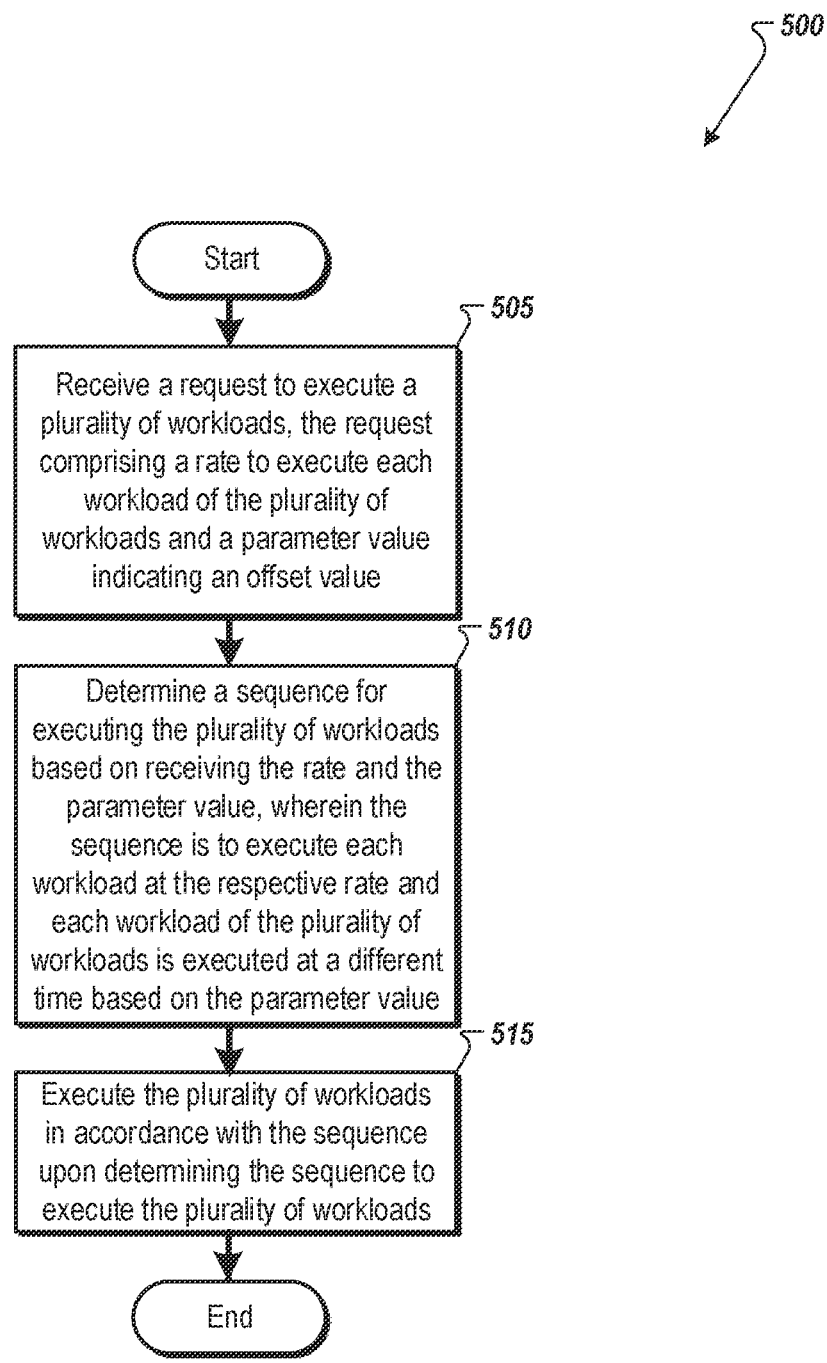
FIG. 5 is a flow diagram of a method for execution offset rate limiting, in accordance with at least some embodiments

FIG. 5 illustrates a flow diagram of a method 500 for scheduling workload synchronization based on real-time latency measurements according to at least one example embodiment. The method 500 can be performed by processing logic comprising hardware, software, firmware, or any combination thereof. In at least one embodiment, the method 500 is performed by software component 205, hardware component 220, work queue 210, and memory 215 as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 505, processing logic can receive a request to execute a plurality of workloads, the request comprising a rate to execute each workload of the plurality of workloads and a parameter value indicating an offset value. In at least one embodiment, the rate for each workload of the plurality of workloads is different as described with reference to FIG. 3. In at least one embodiment, the parameter value indicates a number of offsets between executing workloads of the plurality of workloads and an offset index as described with reference to FIG. 1. In some embodiments, the parameter value indicates an inter packet burst gap, a number of offsets between executing workloads of the plurality of workloads, and an offset index. In at least one embodiment, the processing logic indicates an inter packet burst gap and a time offset between each workload of the plurality of workloads. In some embodiments, the parameter value indicates an inter packet burst gap and a time to execute a first workload of the plurality of workloads. In some embodiments, the processing logic is to receive a plurality of requests, where each request of the plurality of requests is associated with executing a respective plurality of workloads, and where each request comprises a rate to execute the respective plurality of workloads. In some embodiments, the processing logic is to determine a sequence to execute each request of the plurality of requests responsive to receiving the plurality of requests.

At operation 510, processing logic is configured to determine a sequence for executing the plurality of workloads based on receiving the rate and the parameter value, where the sequence is to execute each workload at the respective rate and each workload of the plurality of workloads is executed at a different time based on the parameter value. In at least one embodiment, the rate of each workload is equal as described with reference to FIG. 2. In some embodiments, the processing logic is to determine an offset between executing workloads of the plurality of workloads responsive to the rate of each workload being equal.

At operation 515, processing logic is to execute the plurality of workloads in accordance with the sequence upon determining the sequence to execute the plurality of workloads. For example, processing logic is to transmit a packet of a plurality of packets in accordance with the sequence.

Figure 6:
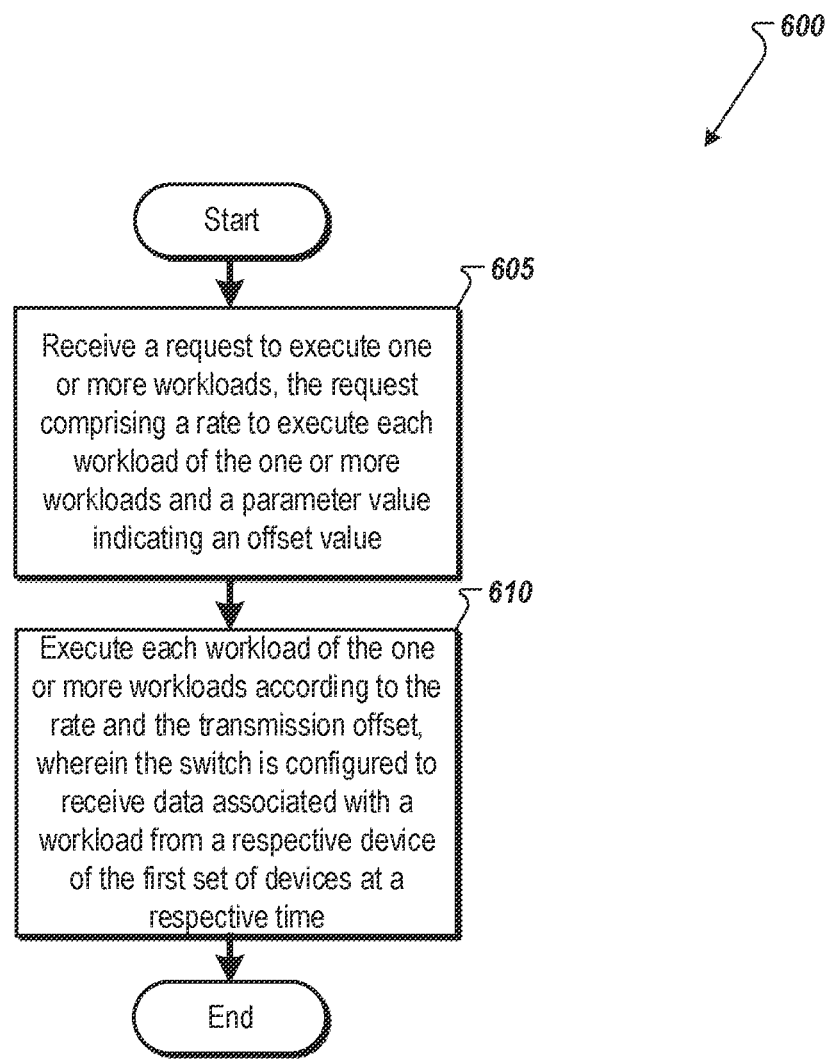
FIG. 6 is a flow diagram for a method for execution offset rate limiting, in accordance with at least some embodiments.

FIG. 6 illustrates a flow diagram of a method 600 for scheduling workload synchronization based on real-time latency measurements according to at least one example embodiment. The method 600 can be performed by processing logic comprising hardware, software, firmware, or any combination thereof. In at least one embodiment, the method 600 is performed by software component 205, hardware component 220, work queue 210, and memory 215 as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. In some embodiments, the method 600 is performed in a system that includes a first set of devices, where each device of the first set of devices is configured to execute one or more workloads. The system can include a second device configured to receive data associated with an execution of the one or more workloads and a switch coupled with the first set of devices and the second device, where the switch is configured to route data associated with the execution of the one or more workloads at the first set of devices to the second device. In at least one embodiment, the method 600 is performed utilizing system 400 as described with reference to FIG. 4.

At operation 605, processing logic can receive a request to execute one or more workloads, the request comprising a rate to execute each workload of the one or more workloads and a parameter value indicating an offset value. In at least one embodiment, the rate for each workload of the plurality of workloads is different. In some embodiments, the parameter value indicates a number of offsets between executing workloads of the plurality of workloads and an offset index.

At operation 610, processing logic execute each workload of the one or more workloads according to the rate and the execution offset, wherein the switch is configured to receive data associated with a workload from a respective device of the first set of devices at a respective time.

In at least one embodiment, a processing logic of a first set of devices are configured to transmit one or more packets responsive to executing one or more workloads. In some embodiments, the processing logic is to receive the one or more packets from the first set of devices and route the one or more packets from the first set of devices to the second device.

Figure 7:
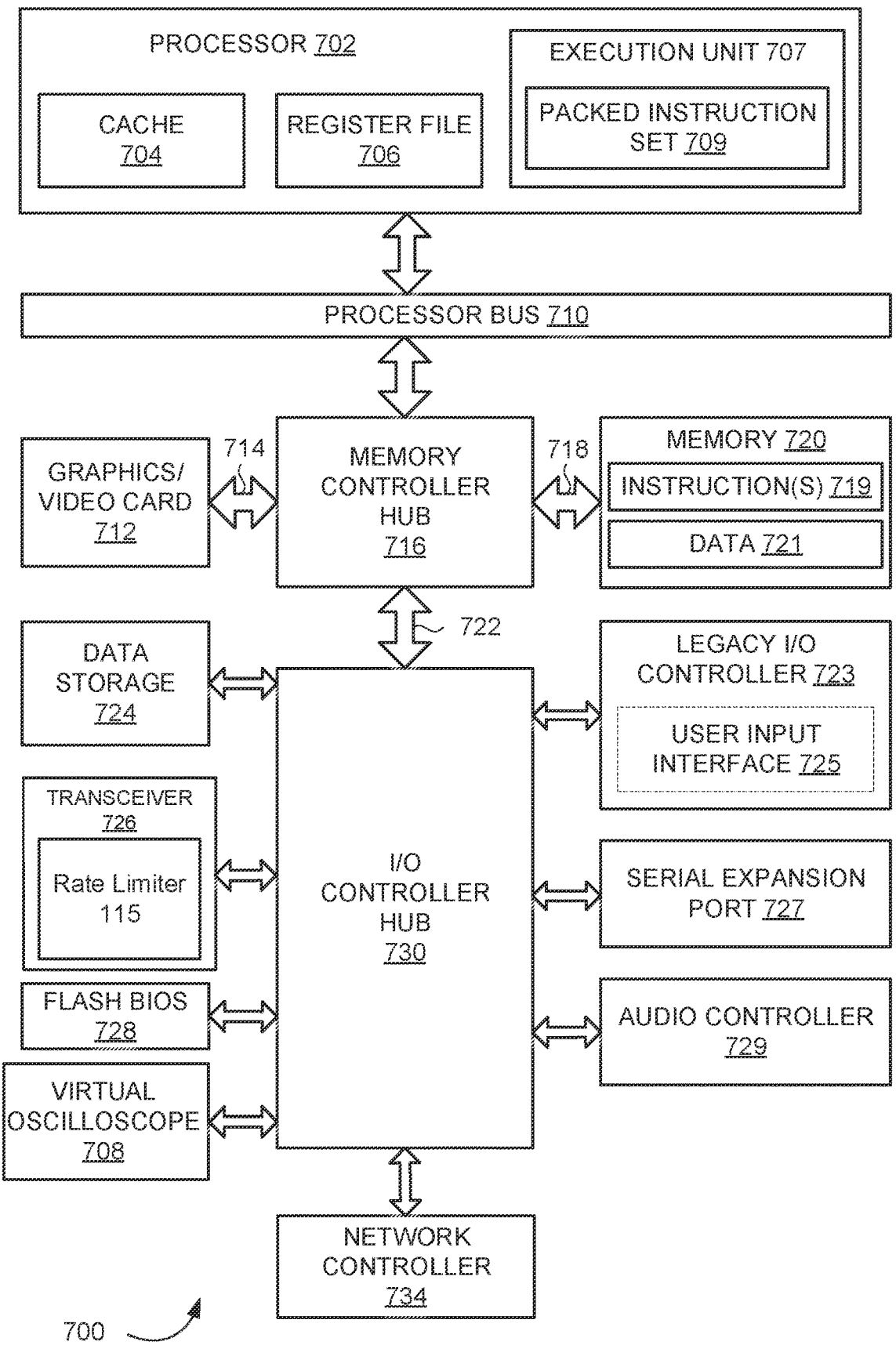
FIG. 7 illustrates an example computer system including a transceiver including a chip-to-chip interconnect, in accordance with at least some embodiments.

FIG. 7 illustrates a computer system 700 in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device. In an embodiment, the transceiver 726 includes a constrained FFE 708.

In at least one embodiment, FIG. 7 illustrates a system, which includes interconnected hardware devices or "chips" in a transceiver 726—e.g., the transceiver 726 includes a chip-to-chip interconnect including the first device 110 and second device 112 as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link. In at least one embodiment, one or more components of system 700 are interconnected using compute express link ("CXL") interconnects. In an embodiment, the transceiver 726 can include an offset rate limiter 115 as described with reference to FIGS. 1A and 1B. In at least one embodiment, the offset rate limiter 115 is configured to execute workloads in an offset manner to pace the overall network traffic as described with reference to FIGS. 1-6.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a device coupled to a processing device and including a rate limiter, the processing device to:
receive a request to execute a plurality of workloads, the request comprising a plurality of rates to execute the plurality of workloads and at least one parameter value indicating an offset value representing a timing offset between execution of corresponding workloads;
determine, using the rate limiter, a sequence for executing the plurality of workloads based on receiving the plurality of rates and the at least one parameter value, wherein the sequence is to cause each workload of the plurality of workloads to be executed at a respective rate of the plurality of rates and at a different time based on the at least one parameter value; and
execute the plurality of workloads in accordance with the sequence upon determining the sequence to execute the plurality of workloads.

2. The system of claim 1, wherein the respective rate for each workload of the plurality of workloads is different.

3. The system of claim 1, wherein the at least one parameter value indicates a number of offsets between executing workloads of the plurality of workloads and an offset index.

4. The system of claim 1, wherein the at least one parameter value indicates an inter packet burst gap, a number of offsets between executing workloads of the plurality of workloads, and an offset index.

5. The system of claim 1, wherein the at least one parameter value indicates an inter packet burst gap and a time offset between each workload of the plurality of workloads.

6. The system of claim 1, wherein the at least one parameter value indicates an inter packet burst gap and a time to execute a first workload of the plurality of workloads.

7. The system of claim 1, wherein the respective rate of each workload is equal, and wherein the processing device is to:
determine an offset between executing workloads of the plurality of workloads responsive to the respective rate of each workload being equal.

8. The system of claim 1, wherein to execute the plurality of workloads, the processing device is to:
transmit a packet of a plurality of packets in accordance with the sequence.

9. The system of claim 1, wherein the processing device is further to:
receive a plurality of requests, wherein each request of the plurality of requests is associated with executing a respective plurality of workloads, and wherein each request comprises a plurality of rates to execute the respective plurality of workloads; and
determine a sequence to execute each request of the plurality of requests responsive to receiving the plurality of requests.

10. A system comprising:
a device coupled to a processing device and including a rate limiter, the processing device to:
receive a request to execute a plurality of workloads, the request comprising a plurality of rates to execute the plurality of workloads and an indication to execute each workload of the plurality of workloads at a different time;

determine, using the rate limiter, an offset value for executing each workload of the plurality of workloads at the different time;

determine, using the rate limiter, a sequence for executing the plurality of workloads based on receiving the rate of each workload of the plurality of workloads and determining the offset value, wherein the sequence is to cause each workload of the plurality of workloads to be executed at a respective rate of the plurality of rates and be transmitted at a different time; and execute the plurality of workloads in accordance with the sequence upon determining the sequence to execute the plurality of workloads.

11. The system of claim 10, wherein the respective rate for each workload of the plurality of workloads is different.

12. The system of claim 10, wherein the offset value indicates a number of offsets between executing workloads of the plurality of workloads and an offset index.

13. The system of claim 10, wherein the offset value indicates an inter packet burst gap, a number of offsets between executing workloads of the plurality of workloads, and an offset index.

14. The system of claim 10, wherein the offset value indicates an inter packet burst gap and a time offset between each workload of the plurality of workloads.

15. The system of claim 10, wherein the offset value indicates an inter packet burst gap and a time to execute a first workload of the plurality of workloads.

16. A system comprising:
a first set of devices, wherein each device of the first set of devices is configured to execute a plurality of workloads;
a second device configured to receive data associated with an execution of the plurality of workloads; and
a switch coupled with the first set of devices and the second device, wherein the switch is configured to route data associated with the execution of the plurality of workloads at the first set of devices to the second device, and wherein each device of the first set of devices is configured to:
receive a request to execute a plurality of workloads, the request comprising a plurality of rates to execute plurality of workloads and a parameter value indicating an offset value representing a timing offset between execution of corresponding workloads; and
execute each workload of the plurality of workloads according to a respective rate of the plurality of rates and a respective timing offset, wherein the switch is configured to receive data associated with a workload from a respective device of the first set of devices at a respective time.

17. The system of claim 16, wherein the first set of devices are further configured to: transmit one or more packets responsive to executing a plurality of workloads.

18. The system of claim 17, wherein the switch is further configured to:
receive the one or more packets from the first set of devices; and
route the one or more packets from the first set of devices to the second device.

19. The system of claim 16, wherein the rate for each workload of the plurality of workloads is different.

20. The system of claim 16, wherein the parameter value indicates a number of offsets between executing workloads of the plurality of workloads and an offset index.

* * * * *